United States Patent
Pouillard et al.

(10) Patent No.: US 10,290,220 B2
(45) Date of Patent: May 14, 2019

(54) METHOD AND DEVICE FOR GUIDING AN AIRCRAFT

(71) Applicant: Safran Electronics & Defense, Boulogne-Billancourt (FR)

(72) Inventors: Sylvain Pouillard, Boulogne-Billancourt (FR); Cedric Bara, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 15/523,931

(22) PCT Filed: Nov. 2, 2015

(86) PCT No.: PCT/EP2015/075481
§ 371 (c)(1),
(2) Date: May 2, 2017

(87) PCT Pub. No.: WO2016/071291
PCT Pub. Date: May 12, 2016

(65) Prior Publication Data
US 2017/0316702 A1   Nov. 2, 2017

(30) Foreign Application Priority Data

Nov. 3, 2014   (FR) ..................................... 14 60566

(51) Int. Cl.
*G08G 5/06*   (2006.01)
*G05D 1/00*   (2006.01)
(Continued)

(52) U.S. Cl.
CPC .......... *G08G 5/065* (2013.01); *G05D 1/0044* (2013.01); *G05D 1/0083* (2013.01);
(Continued)

(58) Field of Classification Search
CPC ...... G08G 5/065; G08G 5/045; G08G 5/0069; G08G 5/0021; G05D 1/0044; G05D 1/0016; G05D 1/0083; G05D 1/0055–1/0077
See application file for complete search history.

(56) References Cited

U.S. PATENT DOCUMENTS

2007/0241935 A1* 10/2007 Pepitone .............. G05D 1/0083
340/958
2009/0045982 A1*  2/2009 Caillaud ................ G01C 21/00
340/972
(Continued)

FOREIGN PATENT DOCUMENTS

EP   1927965   6/2008
EP   2355070   8/2011
(Continued)

OTHER PUBLICATIONS

International Preliminary Report on Patentability with English Language Translation, dated Oct. 20, 2016, Application No. PCT/EP2015/075481.
(Continued)

*Primary Examiner* — Courtney D Heinle
(74) *Attorney, Agent, or Firm* — Womble Bond Dickinson (US) LLP (57) ABSTRACT

The present invention relates to a method for guiding an aircraft over an airport taxiway which is carried out by a data-processing device of a guiding system, wherein said method comprises the steps of determining (E1) at least one possible future path of the aircraft according to the topography of the taxiway in the vicinity of the aircraft, receiving (E2) at least one command relating to the path for the aircraft to follow, selecting (E3) a path to follow from said possible future paths that have been determined and, on the basis of said received command, guiding (E4) the aircraft along the
(Continued)

selected path to follow. When the aircraft is in a region of the taxiway for free manoeuvring in which said aircraft can move freely, said possible future paths that have been determined are paths that correspond to a set of predefined radii of curvature, said received command is a command that relates to a radius of curvature, and the selected path to follow is the possible future path that corresponds to the requested radius of curvature.

12 Claims, 8 Drawing Sheets

(51) Int. Cl.
  *G08G 5/00* (2006.01)
  *G08G 5/04* (2006.01)
(52) U.S. Cl.
  CPC ......... *G08G 5/0021* (2013.01); *G08G 5/0069* (2013.01); *G08G 5/045* (2013.01)

(56) References Cited

U.S. PATENT DOCUMENTS

| | | | | |
|---|---|---|---|---|
| 2009/0150068 A1* | 6/2009 | Villaume | ............. | G05D 1/0083 701/467 |
| 2009/0265089 A1* | 10/2009 | Gauffriau | ............. | G01C 21/00 701/120 |
| 2010/0174425 A1* | 7/2010 | Dal Santo | ............. | G08G 5/045 701/11 |
| 2011/0004376 A1* | 1/2011 | Chatrenet | ............. | B64C 25/426 701/41 |
| 2011/0196598 A1* | 8/2011 | Feyereisen | ............. | G01C 21/00 701/120 |
| 2011/0196599 A1* | 8/2011 | Feyereisen | ............. | G01C 21/00 701/120 |
| 2012/0089277 A1* | 4/2012 | Oyama | ............. | G05D 1/0083 701/3 |
| 2012/0145823 A1* | 6/2012 | Westerlund | ............. | B64F 1/002 244/50 |
| 2012/0158218 A1* | 6/2012 | Funabiki | ............. | B64C 25/50 701/3 |
| 2014/0067169 A1* | 3/2014 | Hughes | ............. | G05D 1/0083 701/3 |
| 2014/0297168 A1* | 10/2014 | Ovens | ............. | G01C 21/3626 701/120 |
| 2015/0142220 A1* | 5/2015 | Scacchi | ............. | G05D 1/0083 701/3 |
| 2015/0298817 A1* | 10/2015 | Jackson | ............. | B64D 45/00 701/3 |
| 2016/0005319 A1* | 1/2016 | Cros | ............. | H04N 7/18 701/3 |
| 2016/0351061 A1* | 12/2016 | Lamkin | ............. | G08G 5/065 |
| 2017/0032687 A1* | 2/2017 | Lamkin | ............. | G08G 5/065 |
| 2017/0158316 A1* | 6/2017 | Sharpe | ............. | B64C 25/505 |
| 2017/0185083 A1* | 6/2017 | Farjon | ............. | G05D 1/0083 |

FOREIGN PATENT DOCUMENTS

| | | |
|---|---|---|
| EP | 2355071 | 8/2011 |
| EP | 2465773 | 6/2012 |
| FR | 2917223 | 12/2008 |
| FR | 2929019 | 9/2009 |
| FR | 2930363 | 10/2009 |

OTHER PUBLICATIONS

French Search Report and Written Opinion, dated Jun. 30, 2015, French Application No. 1460566.

International Search Report with English Language Translation and Written Opinion, dated Feb. 19, 2016, Application No. PCT/EP2015/075481.

* cited by examiner

METHOD AND DEVICE FOR GUIDING AN AIRCRAFT

GENERAL TECHNICAL FIELD

The invention relates to the field of aircraft guidance.

Its subject is more particularly a method for guiding an aircraft during the taxiing phases.

PRIOR ART

During the taxiing phases, an aircraft must be guided over the airport according to the indications from the control tower, for example so that it reaches a take-off runway or maintenance hangar. So that the taxiing phases do not present any danger, it is necessary to avoid any risk of exiting the runway or colliding with another aircraft or any other obstacle that may be on the runways.

When such guidance is done manually by the aircraft pilot, it can be difficult for him or her to simultaneously guide the aircraft to a site to be reached according to the control tower instructions and the airport map, the monitoring of the position of the other aircrafts and vehicles on the runways to avoid any risk of collision, and the position of the aircraft in relation to the runway to avoid going off the runway or any incorrect maneuver near a boarding gate (gating). This is especially hard as the pilot generally has access to limited means for visually monitoring the position of the aircraft, particularly during turns or during the "gating" phases.

This is particularly true in the case of remote piloting of remote-controlled drones. This is because the pilot of such a drone only perceives the drone environment via video cameras covering a limited field of view. The quality and resolution of the images transmitted can furthermore be limited to make them compatible with the requirements of a live, wireless retransmission. The pilot of a drone also has no perception of the acceleration of his or her aircraft, unlike the pilot of an aircraft situated in the cockpit.

In addition, the distance between the drone and its pilot imposes substantial latency in the data exchanges. Such latency considerably lengthens the reaction time of the pilot and can make him or her incapable of following a desired trajectory accurately.

Some systems propose to relieve the pilot of the task of guiding the aircraft and guiding the aircraft autonomously according to the instructions of the control tower and the absolute position of the aircraft in relation to the map of the airport. Such systems require a map and an absolute positioning system that are extremely accurate in order to be able to guide the aircraft with the requisite precision on the airport runways. These systems compute a route to be followed for the aircraft according to the airport map, the position of the aircraft and the instructions from ground control.

These systems are however incapable of adapting without a time lag to the trajectory followed by the aircraft in the event of a change in the instructions from ground control. Specifically, ground control is liable to modify the transmitted running orders, for example in order to avoid a collision with another craft or to send the aircraft to a new parking point. The guidance system of the aircraft must then allow the immediate application of the new instructions from ground control. However, in this case autonomous guidance systems require the computing of a new route for the aircraft and impose a time lag before acting on these new instructions.

There is therefore a need for a guidance method that will lighten the workload of the pilot during the taxiing phases and carry out accurate guidance of the aircraft, while allowing new taxiing instructions to be acted on at any time without any lag.

OVERVIEW OF THE INVENTION

The present invention relates, according to a first aspect, to a method for guiding an aircraft over an airport taxiing area implemented by a data-processing device of a guidance system, characterized in that it comprises the steps of:

- determining at least one possible future trajectory of the aircraft according to the topography of the taxiing area in the vicinity of the aircraft,
- receiving at least one command relating to the trajectory to be followed by the aircraft,
- selecting a trajectory to be followed from several determined possible future trajectories and according to said received command,
- guiding the aircraft along the selected trajectory to be followed and wherein when the aircraft is in a free movement area of the taxiing area in which it can maneuver freely, said determined possible future trajectories are trajectories corresponding to a set of predetermined radii of curvature, said received command is a command relating to a radius of curvature, and the selected trajectory to be followed is the possible future trajectory corresponding to the commanded radius of curvature.

Such a method makes it possible to provide accurate guidance of the aircraft by only requiring of the pilot a choice of trajectory, which can be revised at any moment. In addition, the pilot can thus impose a radius of curvature of his or her choice to impose automatic guidance of the aircraft along the corresponding trajectory.

When the aircraft is in a linear movement area of the taxiing area wherein the aircraft is following one trajectory out of a set of predefined trajectories, said possible future trajectories can be determined from among the set of predefined trajectories, said received command can be a command of a direction to be followed by the aircraft at a coming intersection and the selected trajectory to be followed at said intersection can be the possible future trajectory oriented along said direction to be followed.

Thus the pilot can specify in advance the direction that the guidance must make the aircraft take at the next intersection.

In a first method of implementation, said predefined trajectories can be stored in the form of a map of the georeferenced taxiing area and said possible future trajectories can be determined according to an absolute position of the aircraft and said map.

Such a first method of implementation makes it possible to guide the aircraft in a very accurate manner, without depending on the perception by the systems of the aircraft and its environment.

In a second method of implementation, said data processing device being able to be connected to at least one device for detecting ground indicators, said predefined trajectories are defined by at least one ground indicator, and said possible future trajectories are determined from measurement data measured by said at least one detecting device.

Such a second method of implementation makes it possible to provide autonomous guidance of the aircraft without depending on an external positioning system.

The method according to the first aspect can further comprise a step of detecting an area wherein the data processing device determines whether the aircraft is positioned in a linear movement area or a free movement area of the taxiing area according to an absolute position of the aircraft and a map of the georeferenced taxiing area.

The processing device can thus determine the guidance mode to be applied according to its position in the airport.

Said data processing device being able to be connected to at least one device for detecting markers on the ground, the method according to the first aspect can further comprise a step of detecting an area wherein the data processing device determines whether the aircraft is positioned in a linear movement zone or a free movement zone of the taxiing area according to an absolute position of the aircraft and a map of the georeferenced taxiing area based on measurement data measured by said devices for detecting ground markers.

This allows the processing device to determine the guidance mode to be applied without having to know its absolute position.

The aircraft being positioned in a free movement area of the taxiing area, the step of selecting said trajectory to be followed of the method according to the first aspect can comprise the selection of a future trajectory from among the determined possible future trajectories according to said received command, the detection of an intersection between said selected future trajectory and a boundary between said free movement area and a linear movement area of the taxiing area, and the determination of the trajectory to be followed by correcting the selected future trajectory so that the trajectory to be followed intersects said boundary at one end of a predefined trajectory of said linear movement area.

This makes it possible to ensure that the aircraft will be properly placed in relation to the predetermined trajectory that will start to be followed when it enters a linear guidance area.

Said correction of the selected future trajectory can be done according to a minimum radius of curvature of the aircraft trajectory.

This makes it possible to avoid imposing on the aircraft a guidance instruction that is impossible to follow because of a radius of curvature that it impossible to satisfy.

The method according to the first aspect can further comprise a step of displaying the trajectory to be followed on an image of the topography of the taxiing area in the vicinity of the aircraft.

Such a display allows the pilot to monitor the trajectory that the aircraft will follow and correct his or her command to adapt this trajectory if it is not suitable for him or her.

At least one of said commands can be a command from a pilot of the aircraft.

At least one of said commands can be a manual or voice or touch command.

The pilot can thus possess various methods of inputting his or her commands, without necessarily having to have his or her hands free.

Said guiding step of the method according to the first aspect can comprise the immobilization of the aircraft when a risk of the aircraft colliding with a mobile or immobile obstacle located in the vicinity of the aircraft is detected.

Thus the pilot can be relieved of the task of monitoring the obstacles found on the path of the aircraft while ensuring that it is safe.

According to a second aspect, the invention concerns a computer program product comprising code instructions for executing a method according to the first aspect when this program is executed by a processor.

According to a third aspect, the invention concerns a data processing device of a system for guiding an aircraft in a taxiing area of an airport, said processing device being characterized in that it comprises:
 a module for determining at least one possible future trajectory of the aircraft according to the topography of the taxiing area in the vicinity of the aircraft,
 a module for receiving at least one command relating to the trajectory to be followed by the aircraft,
 a module for selecting a trajectory to be followed from said determined possible future trajectories and according to said received command,
 a module for guiding the aircraft along the selected trajectory to be followed
and wherein when the aircraft is in a free movement area of the taxiing area in which it can maneuver freely, said determined possible future trajectories are trajectories corresponding to a set of predetermined radii of curvature, said received command is a command relating to a radius of curvature, and the selected trajectory to be followed is the possible future trajectory corresponding to the commanded radius of curvature.

Such computer program product and data processing devices have the same advantages as those described for the method according to the first aspect.

OVERVIEW OF THE FIGURES

Other features and advantages will become apparent on reading the following description of an embodiment. This description will be given with reference to the appended drawings wherein.

DETAILED DESCRIPTION

Figure 1:
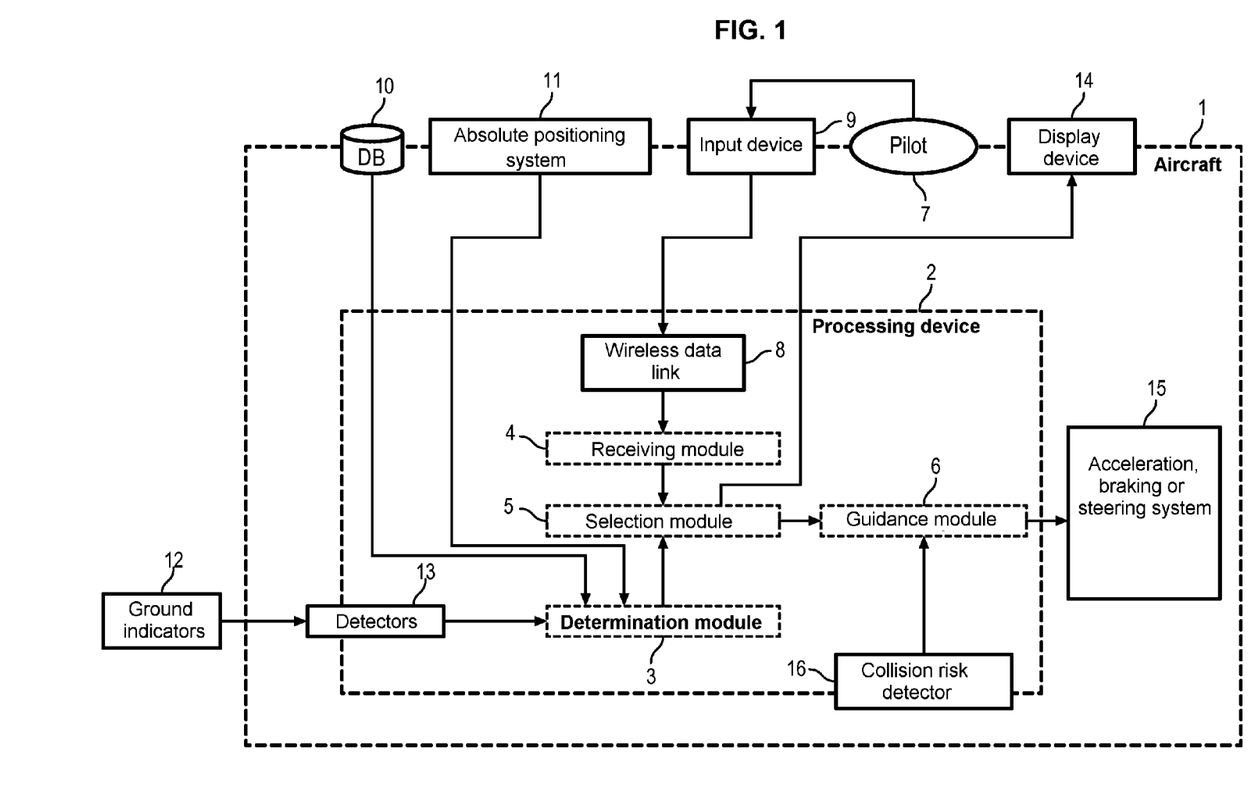
FIG. 1 schematically illustrates an example of an architecture for the implementation of a guidance method according to the invention.

A method of implementation of the invention concerns a method for guiding an aircraft 1 in a taxiing area of an airport, implemented by a data processing device 2, represented in FIG. 1. This performs the autonomous guiding of the aircraft 1 along a trajectory chosen from among several possible trajectories for the aircraft, for example by the pilot of the aircraft. Unlike existing autonomous guiding methods, the pilot can modify his or her choice of trajectory at any time and the trajectory of the aircraft can be adapted immediately.

Figure 2:
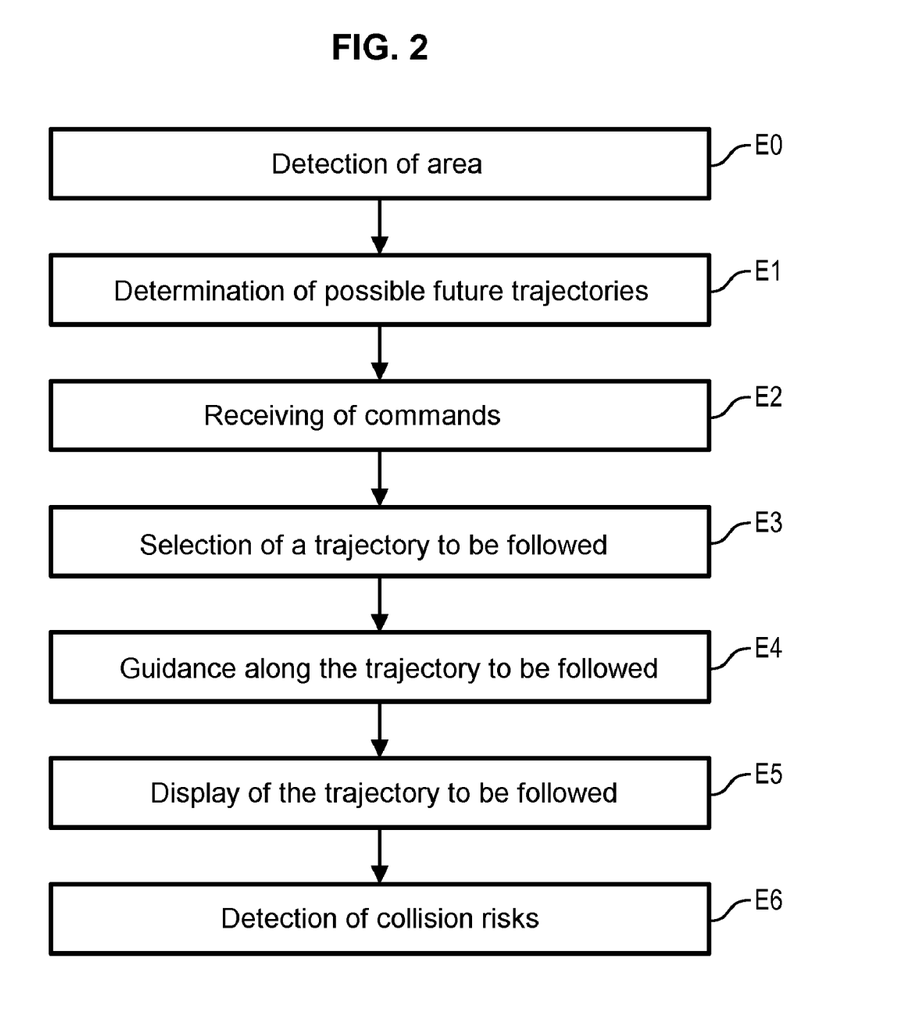
FIG. 2 is a diagram showing in schematic form an example of implementation of a method for guiding an aircraft according to the invention.

To do this, as represented in FIG. 2, a determination module 3 of the data processing device 2 can determine in a determining step E1 at least one possible future trajectory of the aircraft according to the topography of the taxiing area in the vicinity of the aircraft. A reception module 4 of the data processing device 2 can then receive, in a receiving step E2 at least one command relating to the trajectory to be followed by the aircraft. A selection module 5 of the data processing device 2 can then select, in a selection step E3 a trajectory to be followed according to the determined possible future trajectories and the received command. Finally, a guidance module 6 of the data processing device 2 can finally proceed in a guiding step E4 to the guiding of the aircraft along the selected trajectory to be followed.

At least one of the commands received by the data processing device 2 of the relative guidance system can be a command from a pilot 7 of the aircraft. This pilot can be on board the aircraft or else remote, for example in the case of the remote piloting of a drone or else the remote piloting of an aircraft by ground control during its taxiing phases. The processing device can be connected to a wireless data link 8 by which remote commands can be received. The data processing device can thus receive a command transmitted by the control tower in order to indicate to it to change direction or brake to avoid a collision. The processing device can be connected to an inputting device 9 allowing the pilot to input his or her commands. This inputting device can comprise a touch-sensitive screen for inputting touch commands or else a control lever such as a mini-stick for inputting manual commands. This inputting device can also comprise a microphone and a voice recognition device for the transmission of voice commands, in order to authenticate the pilot and recognize the voice command transmitted by him or her.

Figure 3:
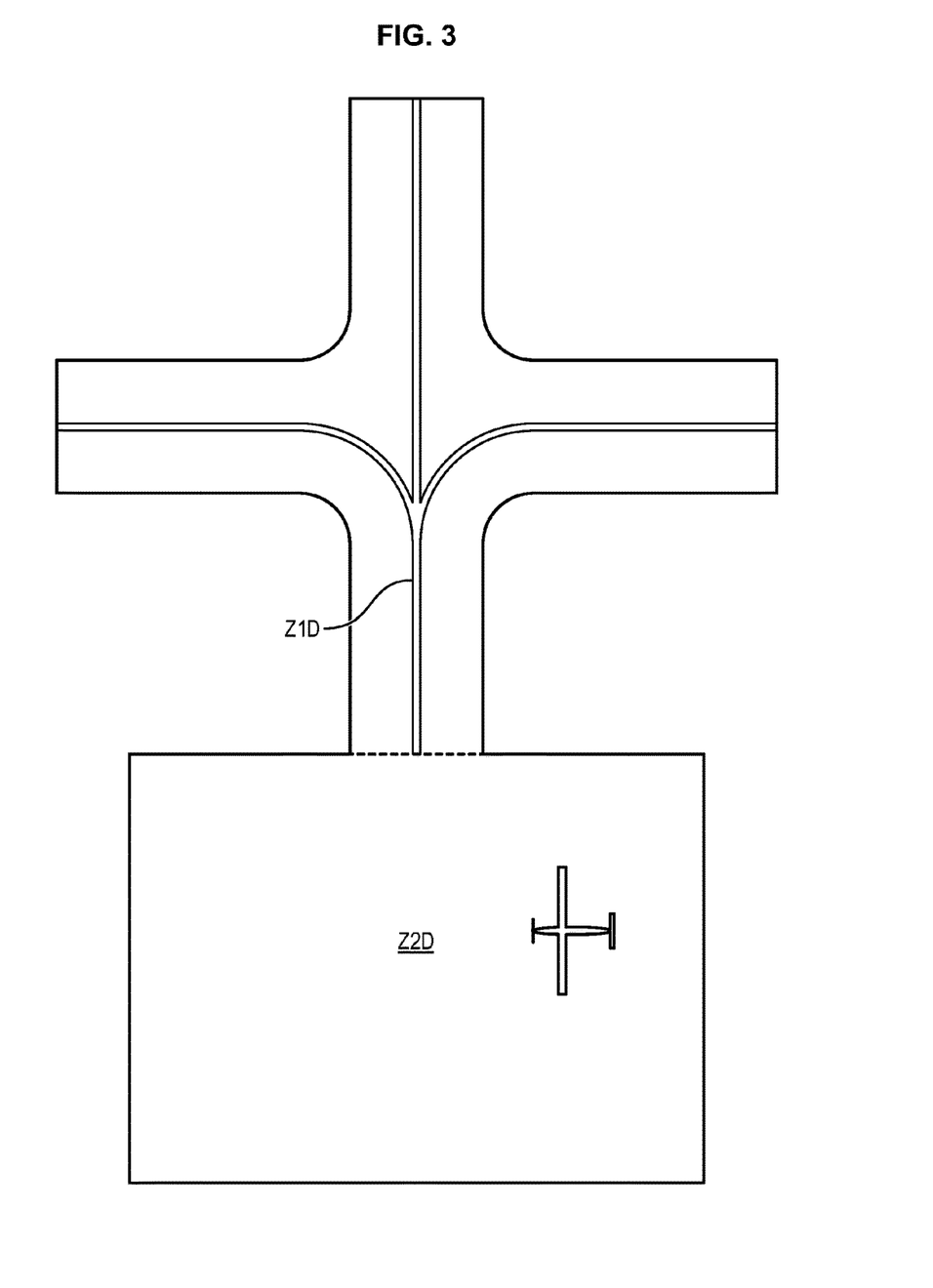
FIG. 3 schematically illustrates a free movement area and a linear movement area in a taxiing area of an airport.

The taxiing area of the airport can be subdivided into two types of area, as represented in FIG. 3:
  free movement areas (Z2D) where aircraft can maneuver freely in order to arrive at a stopping point such as a boarding gate, a parking space, a hangar etc.
  free movement areas (Z1D) wherein the aircraft must follow one trajectory from among a set of predefined trajectories. These areas correspond for example to take-off and landing runways and paths for taxiing ("taxiways") taken by aircraft to travel between the take-off and landing runways and the free movement areas described above. In such areas the aircraft are supposed to follow trajectories defined by the airport authorities such as the center line of such a taxiway. These areas can have intersections or forks at which several trajectories leading in different directions are authorized for an aircraft.

The steps for determining at least one possible future trajectory E1, receiving at least one command relating to the trajectory to be followed E2 and selecting a trajectory to be followed E3 can be implemented differently according to the type of taxiing area wherein the aircraft is found.

Figure 4:
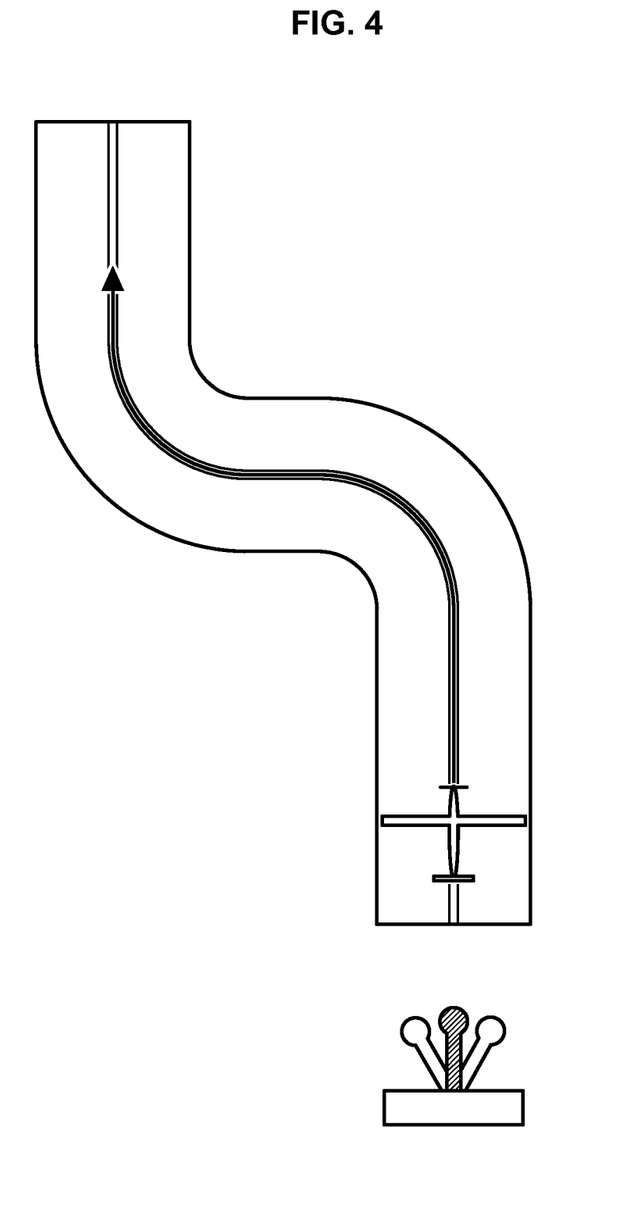
FIG. 4 illustrates an example of implementation of a guidance method according to the invention in a linear movement area comprising only a single predefined trajectory.

When the aircraft is in a linear movement area of the taxiing area wherein the aircraft must follow one trajectory from among a set of predefined trajectories, the determination module 3 of the data processing device 2 can determine the possible future trajectories of the aircraft from among this set of predefined trajectories in the step of determining at least one possible future trajectory E1. To do this, the determination module 3 analyzes the portion of the taxiing area located to the front of the aircraft that the aircraft will encounter in the near future during its travel along the predefined trajectory that it is currently following. If this portion of the taxiing area includes only a single predefined trajectory, it is determined as the only possible future trajectory for the aircraft as represented in FIG. 4. If the portion of the taxiing area analyzed includes a fork, the different predefined trajectories past this fork are determined as the possible future trajectories of the aircraft and the data processing device must determine which trajectory to make the aircraft follow from among the possible future trajectories.

In the step of receiving at least one command relating to the trajectory to be followed E2, the receiving module 4 can then receive from the pilot a command of a direction to be followed by the aircraft at the upcoming intersection. By way of example, the receiving module 4 can receive a command indicating to it to turn right at the next intersection.

Figure 5A:
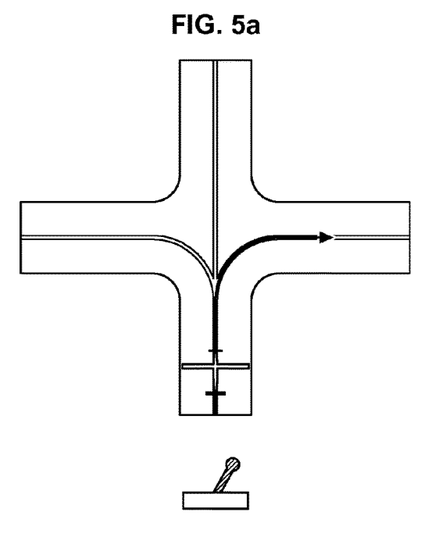
FIGS. 5a, 5b, 5c illustrate an example of implementation of a guidance method according to the invention in a linear movement area comprising an intersection.
Figure 5B:
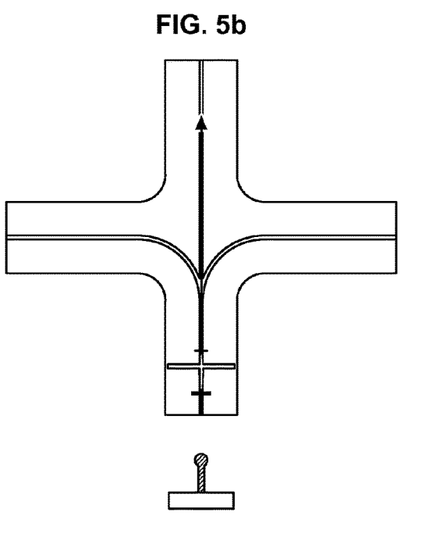
Figure 5C:
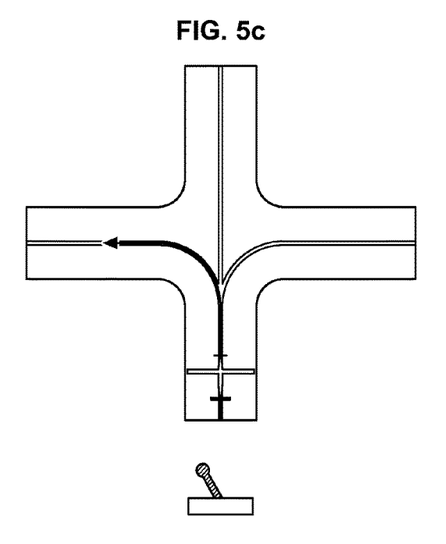

In the step of selecting a trajectory to be followed E3, the selection module 5 can then select as the trajectory to be followed at this intersection the possible future trajectory oriented along the direction to be followed specified by the received command, as represented in FIGS. 5a, 5b, 5c.

Once the intersection has been reached, the guidance module 6 then guides the aircraft along the chosen trajectory, the furthest trajectory to the right for example, among the predefined trajectories authorized for the aircraft.

Before each fork, the processing device can thus determine the different trajectories that the aircraft would be able to take and the pilot of the aircraft can specify in advance the trajectory that he or she wants the processing device to make the aircraft follow in the guiding step E4.

According to a first method of implementation, the predefined trajectories are stored in the form of a map of the georeferenced taxiing area. Such a map can be stored in storing means 10, such as a database, connected to the processing device. The processing device can also be connected to an absolute positioning system 11, on-board such as a GPS, or external, such as a ground radar. In the step of determining at least one possible future trajectory E1, the possible future trajectories of the aircraft can then be determined according to an absolute position of the aircraft provided by the absolute positioning system 11 and said map. The determination module 3 can for example mark the position of the aircraft on the map, determine the position of the next fork along the predefined trajectory currently followed by the aircraft and analyze the predefined trajectories indicated on the map past this fork to determine the possible future trajectories of the aircraft.

According to a second method of implementation, the predefined trajectories of the taxiing area are not stored in the form of a map but are indicated directly on the taxiing areas by ground indicators 12 such as painted lines, indicator lights, reflectors etc. The data processing device can then be connected to at least one ground indicator detection device 13. These detection devices 13 can include an image sensor and image processing means making it possible recognize the position of the ground indicators and deduce the predefined trajectory or trajectories present in the image. In the step of determining at least one possible future trajectory E1, the possible future trajectories of the aircraft can then be determined by the determination module 3 from measurement data measured by said at least one detection device 13.

When the aircraft reaches an intersection without having received any instruction relating to the direction for the aircraft to take for this intersection, the processing device can suggest a command by default, for example to go in a straight line. Alternatively, when the inputting device 9 is a control lever, the position of it constantly indicates the direction command to be followed at the next fork.

The pilot 7, knowing the map of the airport and the destination of the aircraft indicated by the control tower, can thus command the direction for the aircraft to take at the next intersection it encounters on the path to its destination. Once the direction command is inputted, the pilot no longer has to concern themselves with the guidance of the aircraft which is then entirely handled by the processing device, at least until the next fork or until leaving of the linear movement area wherein the aircraft is found. As long as the aircraft has not reached the next fork, the pilot can modify its direction command, for example in order to act on a new instruction from ground control.

Figure 6:
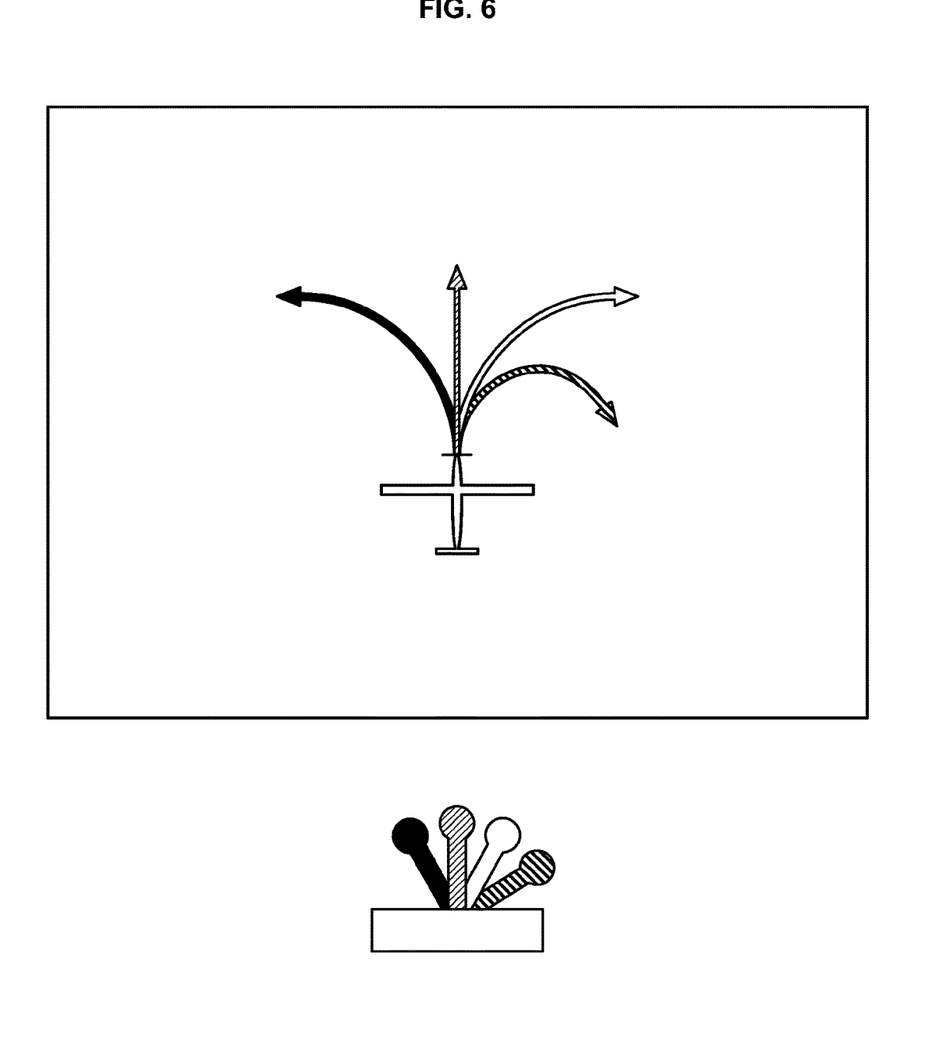
FIG. 6 illustrates an example of implementation of a guidance method according to the invention in a free movement area.

When the aircraft is in a free movement area no predefined trajectory is imposed on the aircraft. In the step E1 of determining at least one possible future trajectory, the possible future trajectories determined by the determination module 3 can then be trajectories corresponding to a set of predetermined radii of curvature which can be applied to the aircraft by the pilot in order to make it turn. To each possible radius of curvature there then corresponds a possible future trajectory for the aircraft in the free movement area starting from its current location, as represented in FIG. 6.

In the step E2 of receiving at least one command relating to the trajectory to be followed, the receiving module 4 can then receive from the pilot a command relating to a radius of curvature of a trajectory to be applied to the aircraft. By way of example, in the case of a control lever, each possible position of the lever can correspond to a different radius of curvature and the possible future trajectories determined in the determination step E1 can correspond to the set of positions possible for this lever.

In the step E3 of selecting a trajectory to be followed, the selection module 5 can then select as trajectory to be followed the possible future trajectory corresponding to the commanded radius of curvature. The guiding of the aircraft is then done autonomously by the guidance module in the guiding step E4 along this trajectory until the commanded radius of curvature is modified, the aircraft leaves the free movement area or is stopped.

The method can also comprise a step E0 for detecting an area, implemented by the determination module 3, wherein the data processing device determines whether the aircraft is positioned in a linear movement area or a free movement area of the taxiing area.

According to a first method of implementation, such detection is done according to an absolute position of the aircraft, provided by an absolute positioning system 11 as described above, and a map of the georeferenced taxiing area, such as that stored in the storage means 10 described above.

According to a second method of implementation, the data processing device is connected to at least one ground marker detection device 13 such as that described above and such detection is done based on measurement data measured by the ground marker detection devices 13. Such markers can for example be placed on the taxiing area continuously or regularly so that the processing device can constantly determine the type of area in which the aircraft is found according to the markers located in the immediate vicinity of the aircraft. Alternatively such markers are positioned solely on the taxiing area at the boundary between areas of different types in order to warn the processing device of a change of area if the aircraft crosses this boundary.

Figure 7A:
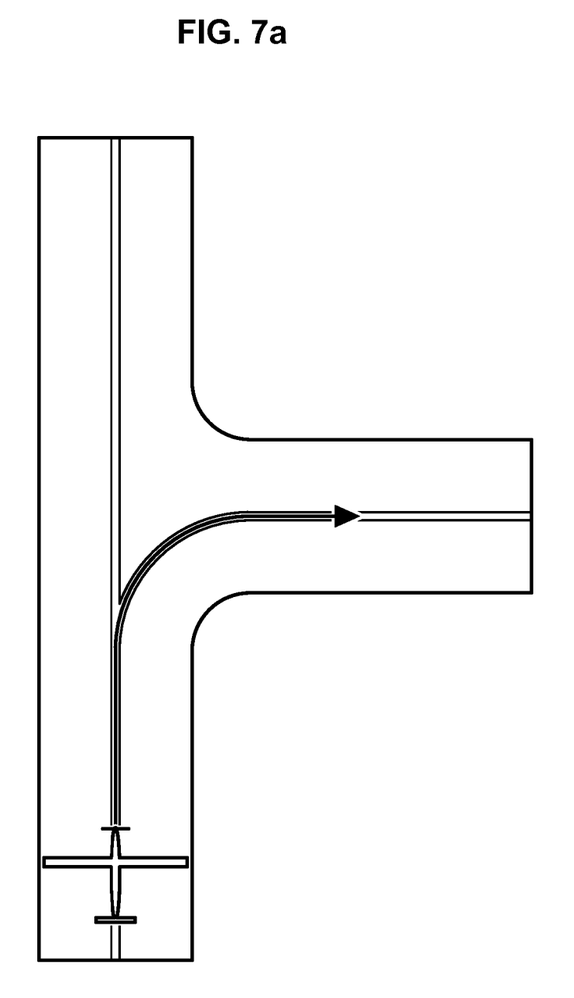
FIGS. 7a and 7b illustrate examples of displays of the trajectory to be followed.
Figure 7B:
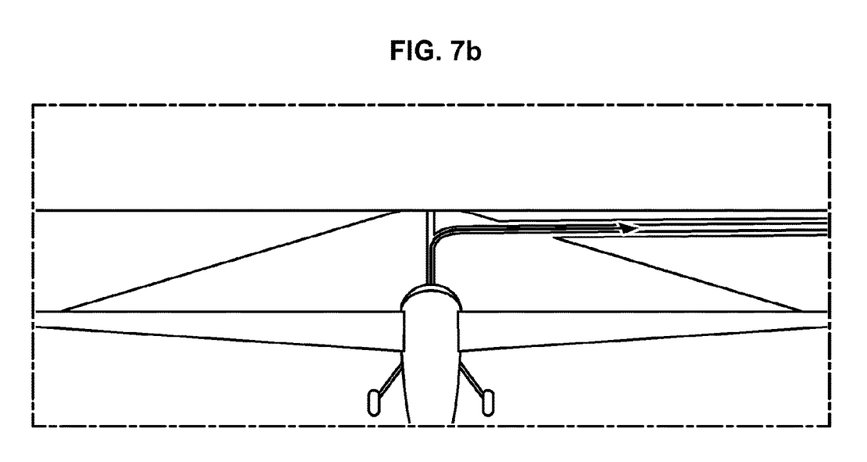

The method can comprise a step E5 of displaying the trajectory to be followed on an image of the topography of the taxiing area in the vicinity of the aircraft, displayed on a display device 14 such as a screen connected to the processing device and placed near the pilot, as represented in FIGS. 7a and 7b. Such an image can be a 2D top view coming from a map, or else a 3D coming from an on-board image capturing device and connected to the processing device. The pilot can thus check that his or her command has been acted on and check the trajectory to be followed that the aircraft will consequently be taking. The pilot can also adapt his or her command if he or she notices that the trajectory that the aircraft is going to take does not correspond to the one that he or she wants to make it take.

When the aircraft leaves a free movement area to enter a linear movement area, the trajectory taken by the aircraft selected according to the last radius of curvature commanded by the pilot runs the risk of making the aircraft enter the linear movement area outside a predefined trajectory of this area. For example when the aircraft leaves a parking area to follow a taxiway, it runs the risk of not being positioned correctly in the center of the taxiway. The trajectory of the aircraft must then be adapted by the processing device 2 to correspond to a predefined trajectory of the linear movement area, for example to replace the aircraft on the center line of the taxiway.

Figure 8:
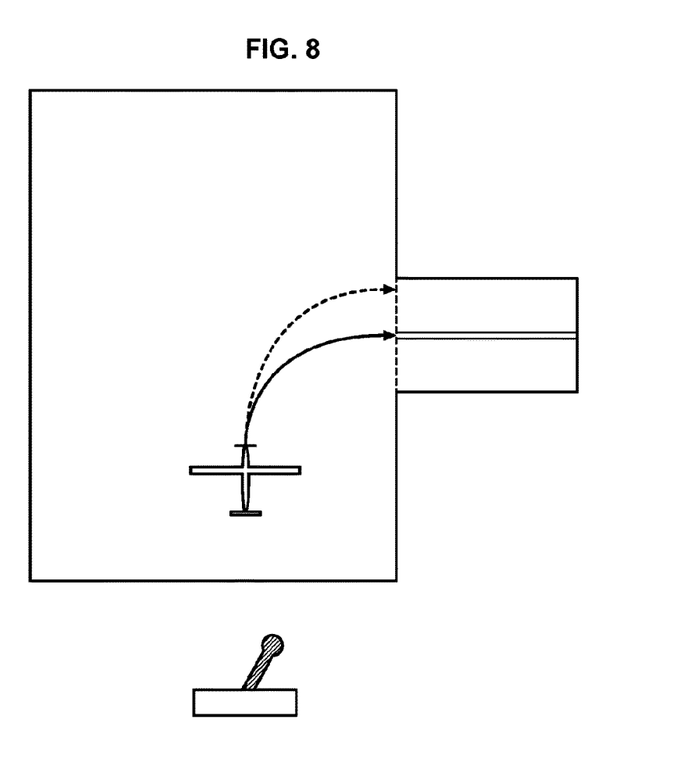
FIG. 8 illustrates an example of implementation of a guidance method according to the invention as it passes from a free movement area to a linear movement area.

To do this, as represented in FIG. 8, when the aircraft is positioned in a free movement area of the taxiing area, the step of selecting said trajectory to be followed E3 comprises:
  the selection of a future trajectory from among the determined possible future trajectories according to the received command,
  the detection of an intersection between the selected future trajectory and a boundary between said free movement area and a linear movement area of the taxiing area,
  and the determination of the trajectory to be followed by correcting the selected future trajectory so that the trajectory to be followed intersects said boundary at one end of a predefined trajectory of said linear movement area.

The trajectory to be followed by the aircraft is thus adapted so that the aircraft enters the linear movement area being properly aligned with a predefined trajectory of this area, without the pilot having to input an additional command or regaining control by manual piloting.

The correction of the selected future trajectory made by the processing device can be carried out according to a minimum radius of curvature of the aircraft trajectory. Specifically, in some cases the requisite correction could exceed this minimum radius of curvature. The trajectory that would allow the aircraft to align with a predefined trajectory would not then be able to be followed by the aircraft. In order to avoid requiring the guidance module to guide the aircraft along a trajectory that is impossible to follow and running the risk of misleading the pilot by displaying for him or her a trajectory to be followed by the aircraft that does not correspond to that which the aircraft will actually follow, the selection module can choose in this case, for example, to not correct the selected future trajectory or else to select as the trajectory to be followed the possible future trajectory corresponding to the minimum radius of curvature of the aircraft trajectory.

The commands received by the processing device can also comprise braking or acceleration commands intended to modify the taxiing speed of the aircraft on the runway or instructions directly concerning speed.

In the guiding step E4, the guidance module 6 of the data processing device 2 can proceed to guide the aircraft along the trajectory to be followed selected according to the absolute location of the aircraft and a map of the georeferenced taxiing area, or else according to the relative position of the aircraft in relation to ground indicators positioned along a predefined trajectory, or again according to measurement data from on-board sensors such as accelerometers, inertial sensors or odometers. To carry out this guidance, the guidance module can actuate the acceleration, braking or steering systems of the aircraft 15 so as to make the aircraft follow the desired trajectory. The guidance module can generate commands to actuate the nose gear, the braking system and the motor system of the aircraft, such as the engine of the aircraft or an EGTS (Electric Green Taxiing System).

The processing device 2 can moreover comprise or be connected to a module 16 for detecting collision risks. Such a module can comprise one or more sensors intended to detect the presence of obstacles near to or in the vicinity of the craft. The method can comprise a detection step E6 during which the collision risk detection module determines whether at least one obstacle, mobile or immobile, located in the vicinity of the aircraft poses a risk of collision with the aircraft. When a collision risk is detected, the detection module can then command the immobilization of the aircraft to avoid the collision. The pilot is thus relieved of the responsibility of monitoring the aircraft environment to avoid collisions.

The processing device can also command the immobilization of the craft when it is in a free movement area, when the trajectory to be followed along which it is guided causes it to reach a boundary between this area and an undefined area. Such an undefined area can correspond to an area of the airport in which no craft is intended to taxi, such as a center strip, located beyond the taxiing area. The processing device can thus for example prevent the aircraft from crossing the edges of the taxiing area and finding itself off the runway following a pilot error.

The workload of the pilot is thus lightened during the taxiing phases. Specifically, the latter now only needs to define the directions that the aircraft must follow at forks in the linear guidance areas and the radius of curvature of the aircraft trajectory in the free guidance areas. The system also allows the pilot to modify the aircraft trajectory at any time to act on the instructions from ground control.

The invention claimed is:

1. A method for guiding an aircraft over an airport taxiing area, implemented by a data processing device of a guidance system, wherein it comprises steps of:
   determining a set of possible future trajectories of the aircraft according to the topography of the taxiing area in the vicinity of the aircraft,
   receiving at least one command relating to a trajectory to be followed by the aircraft,
   selecting a trajectory to be followed from the set of determined possible future trajectories and according to said received command,
   guiding the aircraft along the selected trajectory to be followed,
   wherein when the aircraft is in a free movement area of the taxiing area, in which no predefined trajectory is imposed on the aircraft so that the aircraft can manoeuvre freely in order to arrive at a stopping point including a boarding gate, a parking space, or a hangar, said determined possible future trajectories are trajectories corresponding to a set of predetermined radii of curvature, said received command is a command relating to a radius of curvature, and the step of selecting said trajectory to be followed comprises:
   a selection of a future trajectory, wherein the selected future trajectory is the possible future trajectory corresponding to the commanded radius of curvature,
   a detection of an intersection between said selected possible future trajectory and a boundary between said free movement area and a linear movement area of the taxiing area, in which the aircraft must follow trajectories defined by the airport authorities, and
   a determination of the trajectory to be followed is obtained by correcting the selected future trajectory so that the trajectory to be followed intersects said boundary at one end of a trajectory of said linear movement area, and is made according to a minimum radius of curvature of the trajectory to be followed.

2. The method as claimed in claim 1, wherein when the aircraft is in a linear movement area of the taxiing area wherein the aircraft is following one trajectory out of a set of trajectories defined by the airport authorities, said possible future trajectories are determined from among the set of trajectories defined by the airport authorities, said received command is a command of a direction to be followed by the aircraft at a coming intersection and the selected trajectory to be followed at said intersection is the possible future trajectory oriented along said direction to be followed.

3. The method as claimed in claim 2, wherein said possible future trajectories are determined according to an absolute position of the aircraft and according to the trajectories defined by the airport authorities, which are reported on a map of a georeferenced taxiing area and stored.

4. The method as claimed in claim 2, wherein said trajectories defined by the airport authorities are defined by at least one ground indicator, and said possible future trajectories are determined from measurement data measured by at least one detecting device for detecting ground indicators, the detecting device being able to be connected to the data processing device.

5. The method as claimed in claim 1, further comprising a step of detecting an area wherein the data processing device determines whether the aircraft is positioned in a linear movement area or a free movement area of the taxiing area according to an absolute position of the aircraft and a map of a georeferenced taxiing area.

6. The method as claimed in claim 2, further comprising a step of determining whether the aircraft is positioned in a linear movement area or a free movement area of the taxiing area from measured data measured by at least one device for detecting ground markers, said device for detecting ground markers being configured to be connected to the data processing device.

7. The method as claimed in claim 1, further comprising a step of displaying the trajectory to be followed on an image of the topography of the taxiing area in the vicinity of the aircraft.

8. The method as claimed in claim 1, wherein at least one of said commands is a command from a pilot of the aircraft.

9. The method as claimed in claim 1, wherein at least one of said commands is a manual or voice or touch command.

10. The method as claimed in claim 1, wherein said guiding step comprises the immobilization of the aircraft when a risk of the aircraft colliding with a mobile or immobile obstacle located in the vicinity of the aircraft is detected.

11. A computer program product comprising code instructions for executing a method as claimed in claim 1 when this program is executed by a processor.

12. A data processing device of a system for guiding an aircraft in a taxiing area of an airport, wherein said data processing device comprises:
- a module for determining a set of possible future trajectories of the aircraft according to the topography of the taxiing area in the vicinity of the aircraft,
- a module for receiving at least one command relating to a trajectory to be followed by the aircraft,
- a module for selecting a trajectory to be followed from the set of determined possible future trajectories and according to said received command,
- a module for guiding the aircraft along the selected trajectory to be followed,
- wherein when the aircraft is in a free movement area of the taxiing area, that is to say an area in which no predefined trajectory is imposed on the aircraft so that the aircraft can manoeuvre freely in order to arrive at a stopping point including a boarding gate, a parking space, or a hangar, or in order to enter a linear movement area, in which the aircraft must follow trajectories defined by airport authorities, said determined possible future trajectories are trajectories corresponding to a set of predetermined radii of curvature, said received command is a command relating to a radius of curvature, and the selection of said trajectory to be followed comprises:
- a selection of a future trajectory, wherein the selected future trajectory is the possible future trajectory corresponding to the commanded radius of curvature,
- a detection of an intersection between said selected future trajectory and a boundary between said free movement area and said linear movement area of the taxiing area, and
- a determination of the trajectory to be followed by correcting the selected future trajectory so that the trajectory to be followed intersects said boundary at one end of a trajectory of said linear movement area, the correction of the selected future trajectory is made according to a minimum radius of curvature of the trajectory to be followed corresponding to the minimum radius of curvature accessible by the aircraft.

* * * * *